US005641963A

United States Patent [19]

Mueller

[11] Patent Number: 5,641,963

[45] Date of Patent: Jun. 24, 1997

[54] INFRARED LOCATION SYSTEM

[76] Inventor: Thomas J. Mueller, 1718 E. Rose La., Phoenix, Ariz. 85016

[21] Appl. No.: 536,151

[22] Filed: Sep. 29, 1995

[51] Int. Cl.[6] .................... G01J 5/10

[52] U.S. Cl. .................... 250/342

[58] Field of Search .................... 250/342, DIG. 1

[56] References Cited

U.S. PATENT DOCUMENTS

| | | | |
|---|---|---|---|
| 5,008,543 | 4/1991 | Bertrand et al. | 250/342 |
| 5,315,363 | 5/1994 | Nettleton et al. | 250/342 X |
| 5,446,285 | 8/1995 | Choi | 250/DIG. 1 |
| 5,567,942 | 10/1996 | Lee et al. | 250/DIG. 1 |

FOREIGN PATENT DOCUMENTS

| | | | |
|---|---|---|---|
| 1-88392 | 4/1989 | Japan | 250/DIG. 1 |

*Primary Examiner*—Edward J. Glick
*Attorney, Agent, or Firm*—Martin L. Stoneman

[57] ABSTRACT

An improved IR detector system is described which uses a plurality of IR detection modules coupled to a central computer to determine the location of an intrusion to the system. Each IR detection module has a plurality of optically isolated lens and detector pairs arranged in an arcuate array coupled to a local microprocessor chip which is unique to that module such that each lens and detector pair produces a response to a sensed intrusion along a particular radial of the array's arc to allow the local microprocessor to produce a coded signal to the central computer which corresponds to the direction of the sensed intrusion. Using a triangulation algorithm, the central computer combines the coded signals from whichever of the plurality of IR detection modules are active to compute the location of the intrusion.

11 Claims, 2 Drawing Sheets

FIG. 4
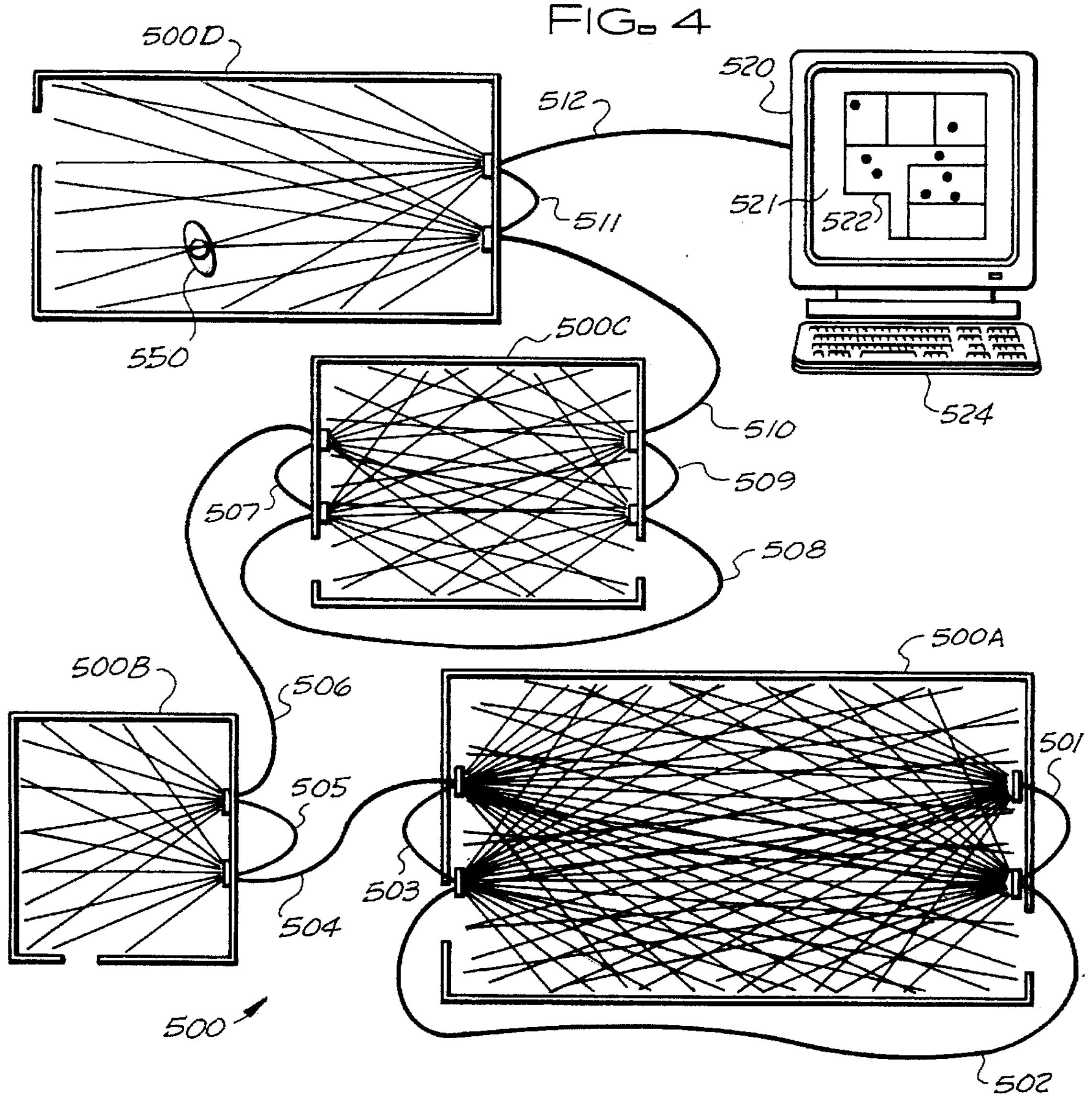
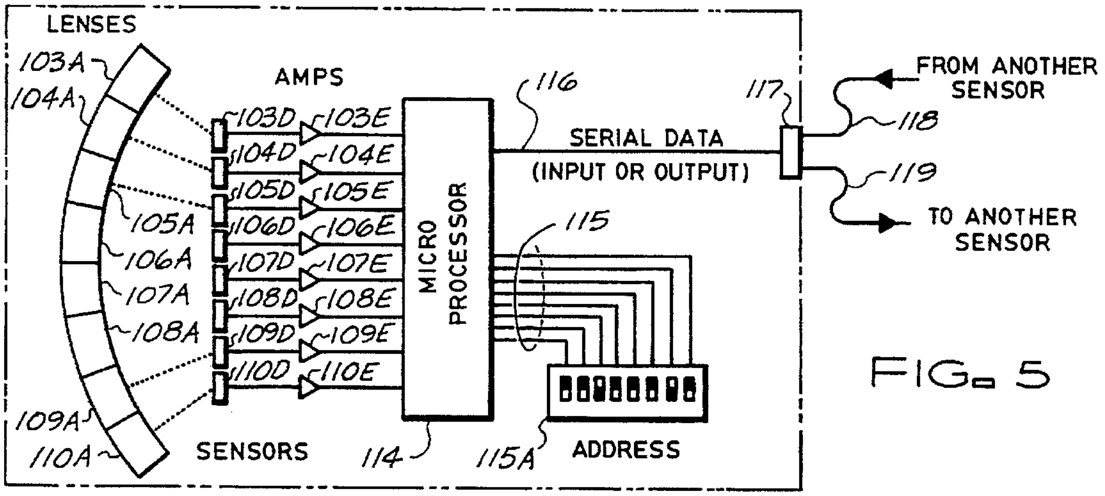
FIG. 5

INFRARED LOCATION SYSTEM

BACKGROUND OF THE INVENTION

1. Field of the Invention

This invention relates generally to passive infrared (IR) detectors and more specifically to an IR location system which uses a plurality of passive IR detectors arranged in specifically designed arcuate arrays and coupled to a local microprocessor to form an IR location system.

2. Description of the Prior Art

It has been known to use detectors sensitive to IR to detect motion. A good discussion of this prior art is provided by Keller-Steinbach, U.S. Pat. No. 4,523,095, where it is explained that a first well known class of prior art applications are IR motion detectors which contain a single IR sensor and multiple lenses each focusing energy from a different location onto the sensor. Thus when an IR emitting body moves, passing from one location (i.e., lens) to another, the intensity read by the sensor varies, thus signaling motion somewhere, (i.e., at a unspecified location within the range of the sensor). As is further discussed in Keller-Steinbach, a weakness in the above class of applications is the frequent occurrence of false alarms, said weakness being eliminated by the use of dual detectors to form a differential sensor which can be balanced to cancel out false alarms due to effects such as ambient temperature, sunlight, heating, cooling, etc.

Other related prior art is provided by Muller, U.S. Pat. No. 4,710,629, which shows another malfunction preventing system; Horii, U.S. Pat. No. 4,912,748, which also uses multiple sensors to prevent errors; Ishikawa et al, U.S. Pat. No. 5,068,537 which uses multiple IR sensors disposed in a straight line to correct errors in a passenger counting system; Guscott, U.S. Pat. No. 5,283,551, which uses an array of IR sensing devices to provide a two dimensional image of an intruder; and Tom, U.S. Pat. No. 5,107,120, which uses multiple adjoining sensors and an arcuate multiple lens to enlarge the field of view of a single sensing device.

In considering the overall objective of an effective intruder detection and alarm system, the actual physical location of the intruder within the area secured by the system is the ultimate objective which the system must achieve in order to be truly effective. Although there is some benefit in knowing that an intrusion has occurred or that an intruder exhibits movement, the real question to be answered in order to determine appropriate action and its urgency is the actual location of the intruder. Thus a need exists for an improved IR detection system which establishes the location of an intruding element quickly and accurately.

OBJECTS OF THE INVENTION

Accordingly, it is an object of this invention to provide an improved IR detector system and to provide an improved method of making such system.

It is a further object of this invention to provide an improved IR detector system which uses multiple lenses and IR sensors.

It is a further object and feature of this invention to provide an improved IR detector system which uses a plurality of IR detector modules coupled to a central computer to determine the location of an intrusion to the system, each module comprising a plurality of optically isolated lens and sensor pairs arranged in an arcuate array coupled to a local microprocessor chip which is unique to that module.

SUMMARY OF THE INVENTION

According to the foregoing objectives, this invention describes an improved IR detector system which uses a plurality of IR detector modules coupled to a central computer to determine the location of an intrusion to the system with each IR detector module comprising a plurality of optically isolated lens and sensor pairs arranged in an arcuate array coupled to a local microprocessor chip which is unique to that module and with each lens and sensor pair producing a response to a sensed intrusion along a particular radial of the array's arc to allow the local microprocessor to produce a coded signal to the central computer which corresponds to the direction of the sensed intrusion. Using a triangulation algorithm, the central computer combines the coded signals from whichever of the plurality of IR detection modules are active to compute the location of the intrusion.

Also, there is provided, according to a preferred embodiment of the present invention, an IR detector system, for locating an intruder within a surveyed area, comprising, in combination: first IR detector means for detecting the presence of such intruder along a first radial line at a first specified angle; second IR detector means for detecting the presence of such intruder along a second radial line at a second specified angle; and central computer means coupled to such first and such second IR detector means for computing the location of such intruder within such surveyed area. Further provided is such first IR detector means and such second IR detector means further comprising IR detector module means having a plurality of lens and IR sensor pairs disposed in an arcuate module, each of such lens and IR sensor pairs having IR isolation from all others of such plurality of lens and IR sensor pairs so that such each of such lens and IR sensor pairs produces maximum IR detection response along a unique radial path of the arc of such arcuate module.

Even further, this invention provides such an IR detector system for locating an intruder within a surveyed area, such IR detector module means further comprising: local microprocessor means for computing a code; and address means coupled to such local microprocessor means for identifying such IR detector module means; such code identifying such unique radial path as detected. Additionally, such system is provided wherein such local microprocessor means further comprises communications port means for transmitting such code to such central computer means. And it is provided wherein such communications port means further comprises dual serial port means for connecting a plurality of such IR detector module means to such central computer means in a "daisy chain" fashion.

Additionally, according to such preferred embodiment, this invention provides such an IR detector system for locating an intruder within a surveyed area, such central computer means further comprising triangulation algorithm means for calculating such location of such intruder from such first and such second specified angles; and, further, wherein such central computer means further comprises graphic display means for displaying a graphical representation of such surveyed area; and, further, wherein such central computer means further comprises personal computer means, such personal computer means further comprising keyboard means for local control of such detector system.

Yet additionally, according to a preferred embodiment thereof, the present invention provides an IR detector system for locating an intruder within a surveyed area, comprising a first IR detector module which has a plurality of lens and IR sensor pairs disposed in a first arcuate module, each of such lens and IR sensor pairs having IR isolation from all others of such plurality of lens and IR sensor pairs, so that such each of such lens and IR sensor pairs produces maximum IR detection response along a unique first radial path of the arc of such first arcuate module so that such first radial path can be used to establish the location of such intruder. And it further provides such an IR detector system further comprising a second IR detector module which has a plurality of lens and IR sensor pairs disposed in a second arcuate module, each of such lens and IR sensor pairs having IR isolation from all others of such plurality of lens and IR sensor pairs so that such each of such lens and IR sensor pairs produces maximum IR detection response along a unique second radial path of the arc of such second arcuate module so that the intersection of such first radial path and such second radial path can be used to establish the location of such intruder.

Moreover, according to a preferred embodiment of the present invention, there is provided a method for making an IR detector system for locating an intruder within a surveyed area comprising the steps of: providing first detector means for detecting the presence of such intruder along a first radial line at a first specified angle; providing second detector means for detecting the presence of such intruder along a second radial line at a second specified angle; and providing central computer means coupled to such first and such second detector means for computing the location of such intruder within such surveyed area.

Further provided according to such embodiment is such a method wherein such first detector means and such second detector means further comprises IR detector module means having a plurality of lens and IR sensor pairs disposed in an arcuate module, each of such lens and IR sensor pairs having IR isolation from all others of such plurality of lens and IR sensor pairs so that such each of such lens and IR sensor pairs produces maximum IR detection response along a unique radial path of the arc of such arcuate module. And it further provides such a method wherein such IR detector module means further comprises: local microprocessor means for computing a code; and address means coupled to such local microprocessor means for identifying such IR detector module means; such code identifying such unique radial path as detected; and, further, wherein such local microprocessor means further comprises communications port means for transmitting such code to such central computer means; and, further, wherein such communications port means further comprises dual serial port means for connecting a plurality of such IR detection module means to such central computer means in a "daisy chain" fashion.

Even additionally, according to such preferred embodiment of this invention, there is provided such a method wherein such central computer means further comprises triangulation algorithm means for calculating such location of such intruder from such first and such second specified angles; and, further, wherein such central computer means further comprises graphic display means for displaying a graphical representation of such surveyed area; and, further, wherein such central computer means further comprises personal computer means, such personal computer means further comprising keyboard means for local control of such system.

Yet further, according to a preferred embodiment thereof, the present invention provides a method for making an IR detector system for locating an intruder within a surveyed area comprising the step of providing a first IR detector module which has a plurality of lens and IR sensor pairs disposed in a first arcuate module, each of such lens and IR sensor pairs having IR isolation from all others of such plurality of lens and IR sensor pairs so that such each of such lens and IR sensor pairs produces maximum IR detection response along a unique first radial path of the arc of such first arcuate module so that such first radial path can be used to establish the location of such intruder. And, additionally, such a method is provided further comprising the step of providing a second IR detector module which has a plurality of lens and IR sensor pairs disposed in a second arcuate module, each of such lens and IR sensor pairs having IR isolation from all others of such plurality of lens and IR sensor pairs so that such each of such lens and IR sensor pairs produces maximum IR detection response along a unique second radial path of the arc of such second arcuate module so that the intersection of such first radial path and such second radial path can be used to establish the location of such intruder.

BRIEF DESCRIPTION OF THE DRAWINGS

FIG. 4 is a pictorial diagram of a detector system according to the present invention for the general case of several detector modules in several rooms.

FIG. 5 is an electrical block diagram of the detector module according to the present invention.

DETAILED DESCRIPTION OF A PREFERRED EMBODIMENT AND THE BEST MODE OF PRACTICE

Figure 1:
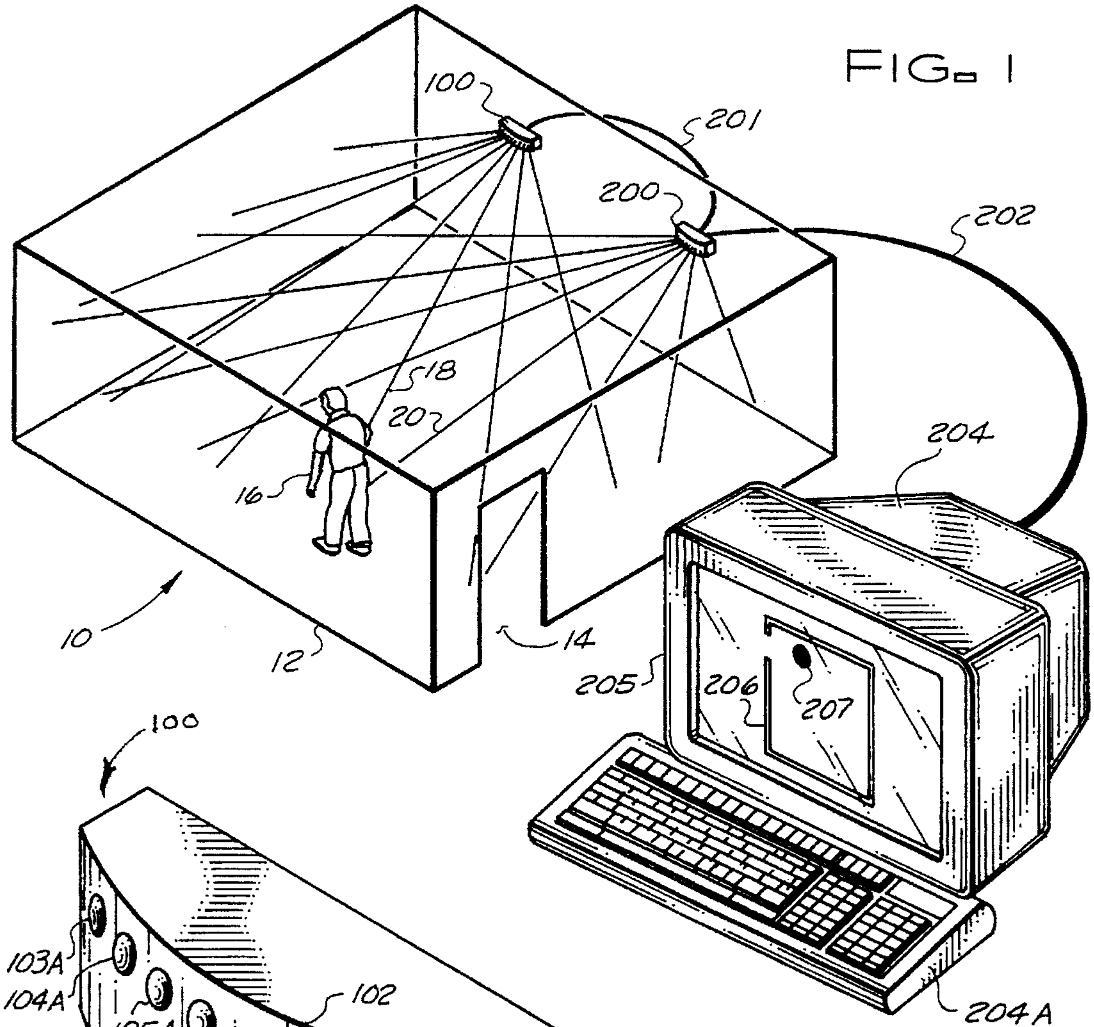
FIG. 1 is a pictorial diagram of a detector system according to the present invention for the simple case of two detector modules in a single room.

FIG. 1 shows a pictorial diagram of a preferred embodiment of a detector system 10 according to the present invention for the simple case of two detector means, using two detector modules 100 and 200 in a single room 12. In FIG. 1, a single room 12 having an entry doorway 14 is shown. Inside room 12, a human intruder 16 is in a location which is in the field of view of a detector module means, embodied by detector module 100, along radial path 18 and the field of view of detector module 200 (a second detector module means) along radial path 20. As will be explained more fully below, a local microprocessor means contained in detector module 100 produces a unique serial code indicative of detection along the particular radial path 18 of its particular module and transmits this unique serial code via transmission path 201 and transmission path 202 to a central computer means, embodied by computer means 204, shown in FIG. 1. In similar fashion, detector module 200 produces a unique serial code indicative of detection along the particular radial path 20 of its particular module and transmits this unique serial code via transmission path 201 and transmission path 202 to a central computer 204 (shown in FIG. 1) in exactly the same manner as was performed by detector module 100. The location of the intruder is determined by the central computer 204 by applying the information for radial path 18 and radial path 20 established by the serial codes received from the detector modules 100 and 200 as inputs to triangulation algorithms which apply well known trigonometric formulas to compute (from the information obtained from the two above-described detector means) the location of intersection of the identified radial paths 18 and 20 and, thereby, the location of the intruder 16 within the surveyed area, in this case the room 12. Central computer 204 has a keyboard means, embodied by control keyboard 204A, which allows local control of the detector system 10. A preferred embodiment of central computer 204 would be a personal computer which could supply the required computing and display capability at low cost. Central computer 204 has a graphical display means, embodied by display monitor 205, which provides a graphical display which, for the particular case of FIG. 1, shows a floor plan diagram 206 and a location dot 207 (or similar symbol) which are representative, respectively, of the surveyed room 12 and the location of the intruder 16 within the room 12.

Figure 2:
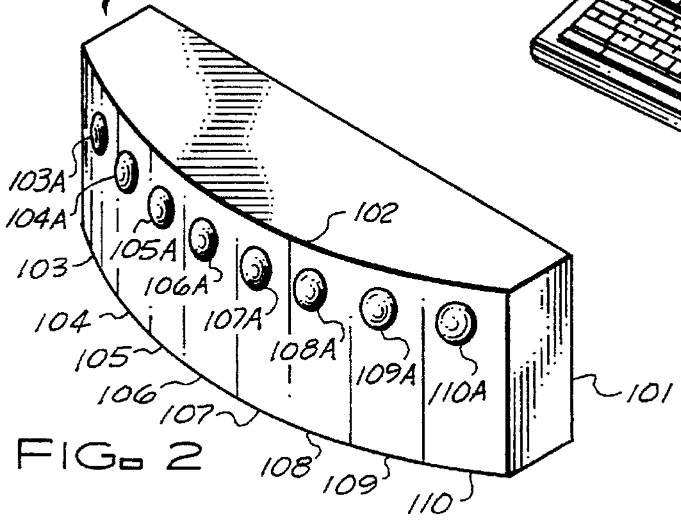
FIG. 2 is a pictorial view showing the external appearance of the IR detector module according to the present invention.

FIG. 2 is a pictorial view showing the external appearance of a preferred embodiment of the IR detector module 100 according to the present invention. As shown in FIG. 2, IR detector module 100 is comprised of an arcuate module, embodied by a rectangular housing 101 bounded by an arcuate front face 102 for providing an arcuate array of lenses as below described. Arcuate front face 102 is divided into eight segments 103–110 each one of which contain a respective IR sensor lens 103A–110A. Thus, as shown in FIG. 2, segment 103 contains lens 103A, segment 104 contains lens 104A and so forth. The external appearance of IR detector module 100 is explained by the internal structure of module 100, which is explained in the discussion of FIG. 3 below.

Figure 3:
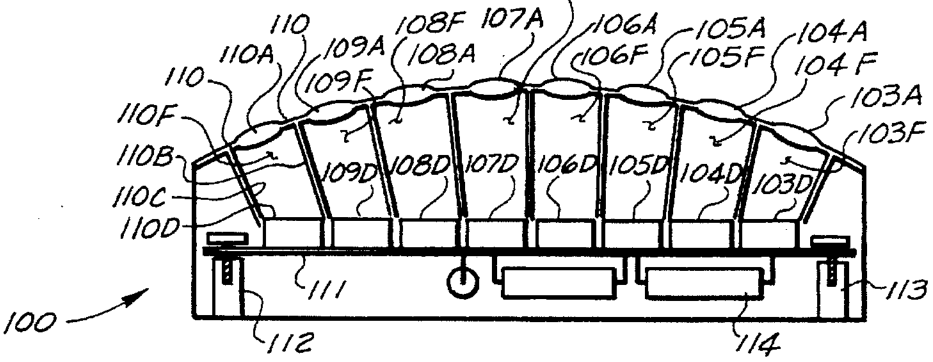
FIG. 3 is a cross sectional view of the detector module according to the present invention as viewed from above.

FIG. 3 shows a cross sectional view of detector module 100 according to the present invention, as viewed from above. As shown in FIG. 3, each of the eight detector lenses 103A–110A is mechanically coupled and IR coupled with a respective chamber 103F–110F which in turn mechanically and IR couples with a respective IR sensor 103D–110D. To simplify the discussion, since each of the eight mentioned lens-sensor assemblies is functionally identical, only the assembly associated with lens 110A will be discussed in detail. As shown in FIG. 3, lens 110A is housed in arcuate segment 110 to form a front portion (of chamber 110F) which is coupled to chamber side portions 110B and 110C. Chamber side portions 110B and 110C function to IR isolate their chamber 110F from the presence of IR energy in any of the chambers associated with the other lenses. Thus the IR energy which is captured and focused by lens 110A is channeled by the structure of chamber 110F to affect only IR sensor 110D. This provides the basic operating characteristic of the detector module 100 in that a maximum electrical response by IR sensor 110D can only be caused by an IR intrusion which is precisely along a radial line through the center of lens 110A. Accordingly, each detector module 100 is characterized by an overall detection angle which is established by the angle between the radial line through the center of lens 103A and the radial line through the center of lens 110A. As is clear to persons skilled in the art, the detection angle of a detector module according to the present invention could be readily changed by changing the curvature of arcuate front face 102 (see FIG. 2). Similarly, the resolution of a detector module could be readily changed by changing the number of lens and IR sensor pairs used. Similarly, after installation of a detector system, the system may be calibrated in well-known ways, as by positioning and re-positioning of an IR emitter in various known locations to calibrate (using central computer 204) from the IR lens/sensor pairs which are then energized, etc.

As is further shown in FIG. 3, IR sensors 103D–110D all are mounted on a top (in FIG. 3) surface of a detector module printed circuit board 111 which is positioned within detector module 100 by support structures 112 and 113 in well-known ways. Electrical connections from IR sensors 103D–110D pass through to a bottom surface of detector module printed circuit board 111 which mounts the other electrical components required for detector module 100 including microprocessor chip 114 as is shown in more detail in FIG. 5.

FIG. 5 shows an electrical block diagram of a preferred embodiment of the detector module 100 according to the present invention. In FIG. 5, lenses 103A–110A are shown coupling to IR sensors 103D–110D (as has been previously described for FIG. 3). FIG. 5 also shows that the electrical connection to each IR sensor 103D–110D couples through a respective buffer amplifier 103E–110E, each of which in turn couples as an input to local microprocessor 114. Thus the electrical connections to IR sensors 103D–110D couple to the inputs to buffer amplifiers 103E–110E whose outputs couple individually as inputs to local microprocessor 114. Describing, according to this preferred embodiment, the address means of the present invention, local microprocessor 114 also has, as an input, an address bus 115 which functions to define the particular detector module within which local microprocessor 114 is functioning. The electrical state of address bus 115 is established by an address control block 115A which responds to mechanical switches as shown in FIG. 5 or to an address connection to the central computer (not shown). As noted above, the function of the local microprocessor 114 is to convert the "one of N hot" data from the IR sensors and the detector module address data into a serial code which uniquely defines the particular IR sensor and the particular detector module which has responded to the presence of an intruder within the detection area surveyed. Once the unique code has been established, local microprocessor 114 transmits this code over serial data path 116 which couples to a communication port means in the form of a dual serial port means, embodied by dual data port 117. Dual data port 117 functions to allow all the detector modules in a particular system to be serially connected in what is commonly called a "daisy chain" fashion in which data from one detector passes through the dual data port of the next connector and so on until it reaches the central computer as an input. Thus FIG. 5 shows a data path 118 from another sensor coupling to dual data port 117 which in turn couples to data path 119 to another sensor.

FIG. 4 shows a pictorial diagram of a detector system 500 according to a preferred embodiment of the present invention for the general case of several detector modules in several rooms. Thus FIG. 4 shows the case of surveillance of a first room 500A which contains four detector modules, a second room 500B which contains two detector modules, a third room 500C which contains four detector modules and a fourth room 500D which contains two detector modules, with all twelve detector modules of the system connected "daisy chain" fashion to a central computer 520 by the series of twelve data paths 501–512. Central computer 520 includes a control keyboard 524 and a display monitor 521 which displays a graphical representation 522 of the area surveyed. Graphical representation 522 can be changed to display particular rooms or areas of interest through the use of keyboard commands applied via keyboard 524. As previously described, the location of any intruder (e.g., intruder 550 in room 500D of FIG. 4) is determined by the central computer 520 by applying the unique radial path information established by the serial codes received from the detector modules as inputs to well known triangulation algorithms which compute the location of intersection of the identified radial paths and thereby, the location of the intruder within the surveyed area.

It should also be noted that although the system diagrams of FIG. 1 and FIG. 4 indicate detector modules in a single horizontal plane to define a two-dimensional surveillance area, the systems can be easily modified to operate in three dimensions by installing additional detectors which are turned to a vertical orientation. The extension of the central computer's triangulation algorithms to include a third dimension and a corresponding adjustment in the graphic displays results in a capability for three-dimensional surveillance.

While the invention has been particularly shown and described with reference to a preferred embodiment thereof, it will be understood by those skilled in the art that changes in form and detail may be made therein without departing from the spirit and the scope of the invention. For example, the physical configuration of the detector module could be changed by using fiber optic paths to transmit the IR energy from the lens to the IR sensor thereby eliminating the physical constraints of the lens chamber.

What is claimed is:

1. An IR detector system, for locating by triangulation an intruder within a surveyed area, comprising, in combination:

first IR motion-detector means for detecting the presence of said intruder along a first radial line at a first specified angle from said first motion-detector means within said surveyed area;

spaced a substantial distance from said first IR motion-detector means, second IR motion-detector means for detecting the presence of said intruder along a second radial line at a second specified angle from said second motion-detector means within said surveyed area; and central computer means coupled to said first and said second IR motion-detector means for computing by triangulation the location of said intruder within said surveyed area;

wherein said first IR motion-detector means and said second IR motion-detector means each further comprises IR detector module means having a plurality of lens and IR sensor pairs disposed in an arcuate module, each of said lens and IR sensor pairs having IR isolation from all others of said plurality of lens and IR sensor pairs so that said each of said lens and IR sensor pairs produces maximum IR detection response along a unique radial path of the arc of said arcuate module.

2. An IR detector system according to claim 1, said IR detector module means further comprising:

local microprocessor means for computing a code; and address means coupled to said local microprocessor means for identifying said IR detector module means;

said code identifying said unique radial path as detected.

3. An IR detector system according to claim 2, said local microprocessor means further comprising:

communications port means for transmitting said code to said central computer means.

4. An IR detector system according to claim 3, said communications port means further comprising:

dual serial port means for connecting a plurality of said IR detector module means to said central computer means in a "daisy chain" fashion.

5. An IR detector system according to claim 1, said central computer means further comprising:

triangulation algorithm means for calculating said location of said intruder from said first and said second specified angles.

6. An IR detector system according to claim 5, said central computer means further comprising:

graphic display means for displaying a graphical representation of said surveyed area.

7. An IR detector system according to claim 6, said central computer means further comprising:

personal computer means;

said personal computer means further comprising keyboard means for local control of said IR detector system.

8. An IR detector system, for obtaining information for triangulation use for locating an intruder within a surveyed area, comprising:

a first IR detector module which has a plurality of lens and IR sensor pairs disposed in a first arcuate module, each of said lens and IR sensor pairs having IR isolation from all others of said plurality of lens and IR sensor pairs, so that said each of said lens and IR sensor pairs produces maximum IR detection response along a unique first radial path of the arc of said first arcuate module so that said first radial path can be used to establish the location of said intruder; and spaced, for said triangulation use, from said first IR detection module, a second IR detector module which has a plurality of lens and IR sensor pairs disposed in a second arcuate module, each of said lens and IR sensor pairs having IR isolation from all others of said plurality of lens and IR sensor pairs so that said each of said lens and IR sensor pairs produces maximum IR detection response along a unique second radial path of the arc of said second arcuate module so that the intersection of said first radial path and said second radial path can be used to establish the location of said intruder.

9. An IR detector system, for locating an intruder within a surveyed area, comprising, in combination:

first IR detector means for detecting the presence of said intruder along a first radial line at a first specified angle;

second IR detector means for detecting the presence of said intruder along a second radial line at a second specified angle; and central computer means coupled to said first and said second IR detector means for computing the location of said intruder within said surveyed area;

wherein said first IR detector means and said second IR detector means each comprise IR detector module means having a plurality of lens and IR sensor pairs disposed in an arcuate module, each of said lens and IR sensor pairs having IR isolation from all others of said plurality of lens and IR sensor pairs so that said each of said lens and IR sensor pairs produces maximum IR detection response along a unique radial path of the arc of said arcuate module; and wherein said IR detector module means further comprises local microprocessor means for computing a code; and address means coupled to said local microprocessor means for identifying said IR detector module means, said code identifying said unique radial path as detected.

10. An IR detector system for locating an intruder within a surveyed area according to claim 9, said local microprocessor means further comprising:

communications port means for transmitting said code to said central computer means.

11. An IR detector system for locating an intruder within a surveyed area according to claim 10, said communications port means further comprising:

dual serial port means for connecting a plurality of said IR detector module means to said central computer means in a "daisy chain" fashion.

* * * * *